(12) United States Patent
Chung et al.

(10) Patent No.: US 8,103,561 B2
(45) Date of Patent: Jan. 24, 2012

(54) RECONCILING FINANCIAL TRANSACTIONS

(75) Inventors: Byung-Hyun Chung, Danville, CA (US); Xin Wang, Los Altos, CA (US); Min Zhu, Pleasanton, CA (US); Craig Hushaw, Stockton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 291 days.

(21) Appl. No.: 12/271,157

(22) Filed: Nov. 14, 2008

(65) Prior Publication Data

US 2010/0125513 A1    May 20, 2010

(51) Int. Cl.
*G07B 17/00* (2006.01)

(52) U.S. Cl. ............... 705/30; 705/33; 705/14; 705/35; 705/36 R; 707/104.1

(58) Field of Classification Search .................... 705/30, 705/33, 14, 35; 707/104.1
See application file for complete search history.

(56) References Cited

U.S. PATENT DOCUMENTS

| | | | | |
|---|---|---|---|---|
| 5,121,945 A | * | 6/1992 | Thomson et al. ............... 283/58 |
| 5,134,564 A | * | 7/1992 | Dunn et al. ..................... 705/33 |
| 6,041,312 A | * | 3/2000 | Bickerton et al. .......... 705/36 R |
| 6,684,384 B1 | * | 1/2004 | Bickerton et al. ............. 717/108 |
| 7,044,365 B2 | * | 5/2006 | Witherspoon ................. 235/379 |
| 7,177,830 B2 | | 2/2007 | Shields et al. |
| 7,240,028 B1 | * | 7/2007 | Rugge .............................. 705/30 |
| 7,590,658 B2 | * | 9/2009 | Bahl et al. ............................ 1/1 |
| 7,689,483 B2 | * | 3/2010 | Wu et al. ......................... 705/35 |
| 2003/0061093 A1 | * | 3/2003 | Todd ................................ 705/14 |
| 2006/0053168 A1 | * | 3/2006 | McDougall et al. ........ 707/104.1 |
| 2009/0157689 A1 | * | 6/2009 | Hotz ................................ 707/10 |
| 2009/0182666 A1 | * | 7/2009 | Geer ................................ 705/45 |

* cited by examiner

*Primary Examiner* — Vanel Frenel

(74) *Attorney, Agent, or Firm* — Squire, Sanders & Dempsey (US) LLP

(57) ABSTRACT

Systems and methods for reconciling financial transactions are described with respect to a number of embodiments of the present disclosure. In one implementation, among others, a method includes enabling a user to define how different types of financial items are grouped. The grouped financial items are selected from one of a financial statement associated with a first account with a first financial institution and financial data recorded by a customer of the first financial institution. The method also includes enabling the user to set matching criteria for matching financial items of the financial statement with financial items of the customer recorded financial data.

22 Claims, 17 Drawing Sheets

ORACLE®

Financial Reconciliation

Home  Main Menu ▶  Recent ▶  Favorites ▶     Preferences   Help   Logout

Search [_____] ▶

Setup > Manage Statement Transaction Creation Rules > Create Statement Transaction Creation Rules Create/Edit Statement Trans. Creation Rules   [Save]  [Save and Close]  [Cancel]

General Information

Name [ABC]            Description [_____]

☑ Active

Statement Line Identification Criteria

Transaction Code [____▶]     Search Field [____▶]

Type [____▶]                 Search String [____]

Transaction Details

Business Unit [____]

Type [____▶]         Cash GL CCID [____]   ☑ Accounting

Subtype [____▶]      Offset GL CCID [____]

Rule Usage
- Accounts
   Account 1
   Account 2

*FIG. 5*

Financial Reconciliation

ORACLE®

Home  Main Menu ▼  Recent ▼  Favorites ▼      Search [___] ▶      Preferences  Help  Logout Setup > Manage Matching Rules > Create Matching Rules

Create/Edit Matching Rules
[ Save ] [ Save and Close ] [ Cancel ]

General Information

Name [ 123456 ]      Description [____]

Transaction Sources  ☑ Payables
                     ☑ Receivables
                     ☐ Payroll                ☑ Active
                     ☐ External

Matching Type

Matching Type [ One to One ▶ ]

Matching Criteria

| Basic | Advanced |

☑ Amount      ☑ Transaction Type
☑ Date        ☐ Reconciliation Reference

Match Rule Usage
- Rule Sets
  Rule Set 1
  Rule Set 2
- Accounts
  Account 1
  Account 2

Financial Reconciliation

ORACLE®

Home   Main Menu ▶   Recent ▶   Favorites ▶   Search [　　　▶]   Preferences   Help   Logout Setup  >  Manage Reconciliation Rules  >  Create Reconciliation Rule Set

Create/Edit Reconciliation Rule Set

[Done]

General Information

Name [123456]

Description

Rule Set Usage
- Accounts
  - Account 1
  - Account 2

Reconciliation Rules

Actions ▶   🖫  ✎  ✕

| Sequence ▽△ | Matching Rule | Matching Type ▽△ | Tolerance Rule |
|---|---|---|---|
| 1 | Rule Name 1 | One to Many | Strict |
| 2 | Rule Name 2 | Many to One | Tolerance Rule 2 |
| 3 | Rule Name 3 | Many to Many | Tolerance Rule 3 |

Financial Reconciliation

ORACLE®

Home  Main Menu ▶  Recent ▶   Search [____] ▶  Favorites ▶   Preferences   Help   Logout Setup > Manage Reconciliation Tolerance Rules > View Reconciliation Tolerance Rules   [Back]   Toler. Rule Usage

Reconciliation Tolerance Rule: ABC

General Information

Name  ABC              Description [____]

☑ Active

- Rule Sets
  - Rule Set 1
  - Rule Set 2
- Accounts
  - Account 1
  - Account 2

Details

Date Tolerance      ☑ Enable
- Days Before   3
- Days After    4

Amount Tolerance    ☑ Enable
- Amount Below  $3.00
- Amount Above  $4.00

Percentage Amt. Toler.  ☑ Enable
- Percent Below  5%
- Percent Above  6%

| Account/ Statement ID | Statement Closing Date | Statement Entry Type | Statement Lines | | | Auto. Reconciliation | |
|---|---|---|---|---|---|---|---|
| | | | Unrec. | Recon. | Total | Except. | Process Status |
| 📁 Account 101 | | | 33 | 68 | 101 | | |
| 📄 Statement 1 | 31-Mar-2008 | Manual | 10 | 53 | 63 | ⇧ | ✓ |
| 📄 Statement 2 | 28-Mar-2008 | Imported | 5 | 5 | 10 | ⇧ | ✓ |
| 📄 Statement 3 | 27-Mar-2008 | Imported | 5 | 6 | 11 | | ✓ |
| 📄 Statement 4 | 26-Mar-2008 | Imported | 5 | 2 | 7 | ⇧ | ✓ |
| 📄 Statement 5 | 25-Mar-2008 | Imported | 3 | 2 | 5 | | ✓ |
| 📄 Statement 6 | 20-Mar-2008 | Imported | 5 | 0 | 5 | | |
| 📁 Account 102 | | | 16 | 2 | 18 | | |
| 📄 Statement 7 | 31-Mar-2008 | Imported | 16 | 2 | 18 | ⇧ | ✓ |
| 📁 Account 103 | | | 8 | 0 | 8 | | |
| 📄 Statement 8 | 03-Mar-2008 | Imported | 8 | 0 | 8 | | ✗ |
| 📁 Account 104 | | | | | 10 | | |

Financial Reconciliation

ORACLE®

Home   Main Menu▶   Recent▶   Favorites▶                    Preferences   Help   Logout Search [_____] ▶

Statement Reconciliation

| Incomplete | Complete |

Saved Search [Last 1 Year ▼]

Action▼ | Statement Closing Date [Week to Date ▼]

| Account/Statement ID | Statement Closing Date | Statement Entry Type | Total Rec. Lines | Reviewed |
|---|---|---|---|---|
| 📁 Account 115 | | | | |
| 📄 Statement 21 | 31-Mar-2008 | Imported | 21 | ✓ |
| 📁 Account 116 | | | | |
| 📄 Statement 22 | 31-Mar-2008 | Imported | 32 | |
| 📄 Statement 23 | 29-Feb-2008 | Manual | 17 | ✓ |
| 📁 Account 117 | | | | |
| 📄 Statement 24 | 31-Mar-2008 | Manual | 41 | |
| 📁 Account 118 | | | | |
| 📄 Statement 25 | 31-Mar-2008 | Imported | 19 | ✓ |
| 📄 Statement 26 | 29-Feb-2008 | Imported | 37 | ✓ |

*FIG. 19*

RECONCILING FINANCIAL TRANSACTIONS

TECHNICAL FIELD

The embodiments of the present disclosure generally relate to financial transactions between a financial institution and a customer. More particularly, the embodiments of the present disclosure relate to computer systems for reconciling these financial transactions.

BACKGROUND

Financial institutions, such as banks, credit unions, savings and loan associations, building societies, asset management firms, investment companies, trust companies, etc., often provide statements to their customers indicating the financial transactions that have taken place over a certain period of time, e.g., one month or a quarter of a year. The customers can use these statements to make sure the transactions reported on the statements match with the customer's own records of the transactions. In this way, the statements can aid the customer in balancing the customer's accounts. As an example, a treasury manager of an organization may be responsible for the task of balancing various accounts to ensure that financial transactions have been entered correctly based on the reporting of the financial institution and records kept at the organization itself.

In the past, financial institutions provided statements exclusively in paper form. In this respect, balancing the accounts involved manual processes that were both time consuming and tedious. However, in recent years, financial institutions have been able to provide statements electronically in order to reduce paper usage. With these electronic statements, some processes have been developed to allow a user to balance accounts electronically. Nevertheless, further improvements regarding reconciliation systems and methods are still needed.

SUMMARY

The present disclosure describes systems and methods for reconciling financial transactions between a financial institution and a customer of the financial institution. In one of several different embodiment described herein, one method includes enabling a user to define how different types of financial items are grouped. The grouped financial items, for example, are selected from one of a financial statement associated with a first account with a first financial institution and financial data recorded by a customer of the first financial institution. The method also includes enabling the user to set matching criteria for matching financial items of the financial statement with financial items of the customer recorded financial data.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

FIG. 5 is a diagram of a graphical user interface (GUI) for creating and editing financial institution and account information, according to one embodiment.

FIG. 7 is a diagram of a GUI for creating and editing matching rules according to one embodiment.

FIG. 8 is a diagram of a GUI for creating and editing matching rules according to another embodiment.

FIG. 9 is a diagram of a GUI for creating and editing matching rules according to another embodiment.

FIG. 12 is a diagram of a GUI for creating and editing reconciliation rules according to one embodiment.

FIG. 13 is a diagram of a GUI for viewing matching rules according to one embodiment.

FIG. 15 is a diagram of a GUI for creating and editing reconciliation tolerance rules according to one embodiment.

FIG. 16 is a diagram of a GUI for viewing reconciliation tolerance rules according to one embodiment.

FIG. 18 is a diagram of a GUI for viewing incomplete reconciled statements according to one embodiment.

FIG. 19 is a diagram of a GUI for viewing completely reconciled statements according to one embodiment.

DETAILED DESCRIPTION

The embodiments of the present disclosure describe systems and methods for reconciling the financial transactions between a financial institution and a customer. Using an electronic statement from a financial institution, software has been developed to electronically match one line of the electronic statement with one line of financial records stored in memory in a customer's computing system. By one-to-one matching, lines of the financial institution's statement and lines of the customer records can be reconciled with each other. When many of the respective lines are match and reconciled, the remaining financial items of an account can be used for the purpose of balancing the account.

However, certain transactions are not recorded on one single line on both the financial institution side and the customer side. For instance, a bank may enter a transaction of, say, $120.70 as $120.00 instead and then realize the error. Instead of correcting the line, they might add another line for the $0.70. Therefore, these two lines can match with a single line the customer's records. On the other hand, one line on a statement or in the customer's records may actually represent more than one transaction. For example, when multiple checks are deposited at a financial institution at the same time, the financial institution may report a single transaction, which may be represented as multiple transactions in a customer's records. Since reconciliation involves more than simple one-to-one (1-1) matching, the embodiments described herein are capable of matching one line on a reported statement to multiple ("M") lines in the customer's record (1-M matching). Also, the embodiments of the present disclosure are also capable of matching multiple lines on a reported statement to one line in the customer's record (M-1 matching). Also, M-M matching is possible according to the teachings of the present disclosure.

As used throughout the present disclosure, the term "financial transaction," as defined in the present disclosure, may relate to any suitable transaction, such as, for example, deposits, withdrawals, checks written and recorded by the financial institution, debit transactions, automatic payments, automatic deposits, batch transactions, bank fees, etc. The term "financial institution" can refer, for example, to a bank, credit union, savings and loan association, building society, asset management firm, investment company, trust company, etc. The term "customer" may refer to a company, organization, business, corporation, enterprise, government agency, department, group, family, individual, etc. Other implementations, benefits, and advantages will become apparent to one of ordinary skill in the art from an understanding of the embodiments of the present disclosure.

Figure 1:
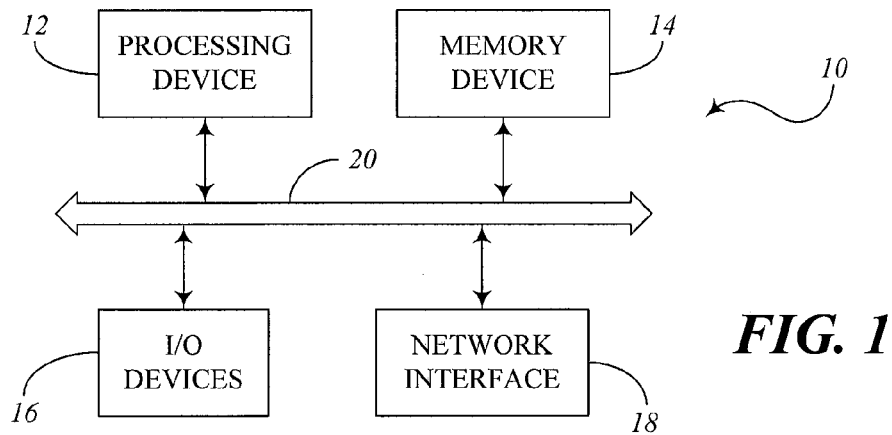
FIG. 1 is a block diagram illustrating a financial reconciliation system according to one embodiment.

FIG. 1 is a block diagram of an embodiment of a financial reconciliation system 10. Financial reconciliation system 10 may represent any type of computing system and may be connected to one or more networks associated with the customer. In the embodiment shown in FIG. 1, financial reconciliation system 10 includes a processing device 12, memory device 14, input/output (I/O) devices 16, and a network interface 18, each interconnected via a bus 20. Financial reconciliation system 10 may be part of an enterprise resource planning ("ERP") system, particularly a portion of an ERP system associated with the customer's financial systems.

Processing device 12 may be a general-purpose or specific-purpose processor or microcontroller. Memory device 14 may include one or more internally fixed storage units, removable storage units, and/or remotely accessible storage units. The storage units can be configured to store information, data, instructions, and/or software code. The storage units may include any combination of volatile memory, such as random access memory (RAM), dynamic RAM (DRAM), etc., and/or non-volatile memory, such as read only memory (ROM), electrically erasable programmable ROM (EEPROM), flash memory, etc.

Memory device 14 can also store program code that enables processing device 12 to execute financial reconciliation procedures. Various logical instructions or commands may be included in the program code for reconciling financial transactions. The embodiments of the reconciliation procedures described in the present disclosure can be implemented in hardware, software, firmware, or a combination thereof. When implemented in software or firmware, the reconciliation procedures or algorithms can be stored in memory device 14 and executed by processing device 12. When implemented in hardware, the reconciliation procedures or modules can be implemented in processing device 12 using discrete logic circuitry, an application specific integrated circuit (ASIC), a programmable gate array (PGA), a field programmable gate array (FPGA), other suitable logic circuit, or any combination thereof.

Reconciliation algorithms, programs, or software, which can be stored partially or fully in memory device 14, and any other software, programs, or computer code including executable logical instructions as described herein, can be embodied in computer-readable media for execution by any suitable processing device, such as processing device 12. The computer-readable media as described herein can include one or more suitable physical media components that can store the software, programs, or computer code for a measurable length of time.

I/O devices 16 may include input mechanisms such as keyboards, keypads, cursor control devices, or other data entry devices. The input mechanisms may be used for entering set-up information for establishing matching rules and reconciliation rules. Input mechanisms may also be used to initiate financial reconciliation procedures and to access results of the financial reconciliation procedures. I/O devices 16 also include output devices, which may be computer monitors, audio output devices, printers, and/or other peripheral devices. Network interface 18 may be configured using wired or wireless components. Network interface 18 includes components for accessing a network, such a data network or a financial network related to the customer's financial accounts or financial records.

Figure 2:
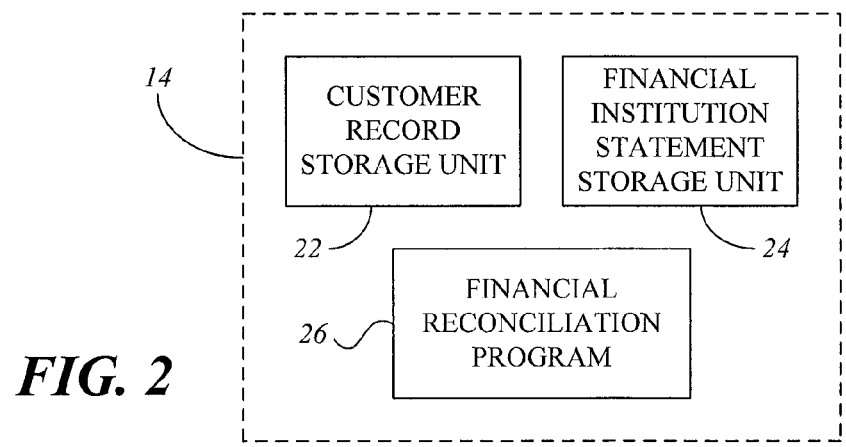
FIG. 2 is a block diagram illustrating the memory device shown in FIG. 1 according to one embodiment.

FIG. 2 is a block diagram of an embodiment of memory device 14 shown in FIG. 1. According to this embodiment, memory device 14 includes customer record storage unit 22, financial institute statement storage unit 24, and financial reconciliation program 26. As suggested above, the components of memory device 14 can be embodied in different memory components located in different devices or locations associated with the customer's network.

Customer record storage unit 22 may include any suitable organizational structure to maintain the transactions of the customer. For example, records may be stored in a transaction table. Customer record storage unit 22 may include an accounts payable (AP) system. Therefore, when an invoice is received, a payment of the invoice can be made and the payment information can be entered into the AP system. Also, customer record storage unit 22 may include an accounts receivable (AR) system. In an AR system, invoices are generated and sent to the prospective payer. When payment for these invoices are received and the payment is deposited in an account, the receivable transaction information is entered in the AR system. In some cases, an indication may be received that an automatic payment has been made to the respective account. Thus these automatic payments can also be recorded in the AR system of customer record storage unit 22. These and other transactions can be recorded in customer record storage unit 22.

Financial institution statement storage unit 24 of memory 14 includes electronic copies of statements for one or more accounts from one or more financial institutions. Financial institution statement storage unit 24 can store the statements as originally provided by the respective financial institutions or the data therein can be uploaded into tables or other suitable structure for maintaining the statements in a format that allows access to various pieces of information of the statements. For example, the statement information stored in financial institution statement storage unit 24 may include transaction amounts, transaction dates, transaction times, types of transactions, reference numbers, customer name, account number, transaction codes, group key, and/or other user-defined data. The group key, as defined in the ISO 20022 standard and other financial standards, refers to an identification by the financial institution of batch transactions.

Customer record storage unit 22 and financial institution statement storage unit 24 may each be configured to include a flag associated with each financial transaction item to indicate whether or not the respective item has been reconciled. For example, storage units 22 and 24 may each include a column in a transaction table that stores a "recon_flag." Financial reconciliation program 26 is configured to set the recon_flag for a particular item to "N" if the item has not yet been reconciled and to "Y" if the item has been reconciled.

Financial reconciliation program 26 includes procedures for comparing the data in customer record storage unit 22 with data in financial institution statement storage unit 24. Using the one-to-one matching scenario for matching transaction items stored in both storage units 22 and 24, financial reconciliation program 26 can reconcile these items. Furthermore, financial reconciliation program 26 also allows a user to set up matching rules to define how financial items can be grouped on the financial institution side, the customer side, or both. By establishing these matching rules, financial reconciliation program 26 can then match items or groups of items of the financial institution statements with items or groups of items in the customer's records. Financial reconciliation program 26 is described in more detail below with respect to FIG. 3.

Figure 3:
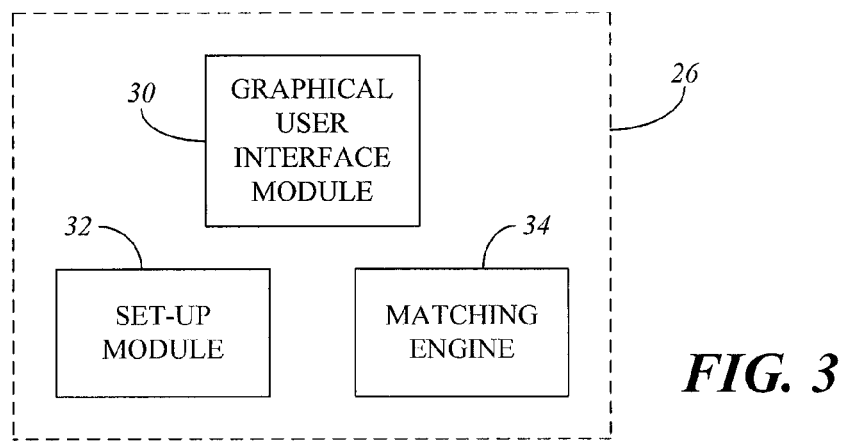
FIG. 3 is a block diagram illustrating the financial reconciliation program shown in FIG. 2 according to one embodiment.

FIG. 3 is a block diagram of an embodiment of financial reconciliation program 26 shown in FIG. 2. According to this embodiment, financial reconciliation program 26 includes graphical user interface (GUI) module 30, set-up module 32, and matching engine 34. Set-up module 32 utilizes GUIs from the GUI module 30 that are related to setting up matching rules and reconciliation rules. Matching engine 34 utilizes GUIs from GUI module 30 that are related to an initiation and actual execution of reconciliation procedures. Matching engine 34 may utilize a set-based SQL execution or other suitable processing scheme for finding multiple matching sets in one query.

GUI module 30 includes a number of GUIs that enable the user to set up or establish matching rules and reconciliation rules. The GUIs allow the user to enter or select one or more financial institutions and one or more accounts associated with the financial institutions. For each account, the GUIs enable the user to select and define how items are grouped for each type of matching scenario involving grouped items, i.e., 1-M, M-1, and M-M. These or other GUIs can also be used to enable the user to set the matching criteria for the respective matching scenario. The matching criteria includes, for example, amounts, transaction dates, types of transactions, reference numbers, customer numbers, account numbers, transaction codes, etc.

In addition to the GUIs for assisting the user to set up matching rules and reconciliation rules, GUI module 30 also includes a GUI that can be used to enable the user to initiate reconciliation procedures based on the predefined matching rules and reconciliation rules. Other GUIs can be included for presenting a list of reconciled statements and a list of un-reconciled statements for reference by the user as needed.

Financial reconciliation program 26 of FIG. 3 also includes set-up module 32 that enables a user to set up or establish the matching rules and reconciliation rules. Normally, the set up process is performed with the help of set-up module 32 before matching can be performed by matching engine 34. When the set-up information is loaded, matching engine 34 can be run as necessary to perform the financial reconciliation procedures described herein. Therefore, set up may be required only once. However, as changes are made to financial institutions, financial accounts, the customer itself, etc., set-up module 32 can be used after the initial set-up to update information as needed.

As suggested above with respect to the discussion of the GUIs, set-up module 32 enables the user to enter and/or retrieve information about one or more financial institutions. Also, set-up module 32 enables the user to enter and/or retrieve information about one or more accounts associated with the financial institutions. Also, set-up module 32 allow the user to define how financial items are grouped in M-1, 1-M, and M-M matching scenarios. Also, the user can create a list of the matching criteria that are to be considered for matching purposes. These processes of set-up module 32 are used to set up what is referred to herein as a matching rule, which includes the grouping attributes and matching criteria for each specific matching scenario.

Once the matching rules are set, set-up module 32 is further configured to enable the user to set up or establish reconciliation rules. Reconciliation rules include a sequence of matching rules and certain tolerances for the matching rules. Usually, the reconciliation rules include a sequence where the strictest matching rule is applied first, followed by less stringent matching rules. Therefore, set-up module 32 enables the user to retrieve the established matching rules for a particular account. To set the reconciliation rule for that account, the various matching rules are ordered to establish a sequence that matching engine 34 can execute the rules.

For each of the respective matching rules, tolerances can be set according to any suitable offsets. For example, a matching rule that includes a "transaction amount" may be set with a tolerance of, say, +/−0.1%. For a matching rule that includes a "transaction date," the tolerance might be set for, say, +/− one day. In addition, the set-up process may include designating whether reconciliation for a match that is not exact but within tolerances is performed automatically or allowed only by manual reconciliation. If automatic reconciliation is allowed for this condition, then financial reconciliation program 26 can automatically balance the accounts as needed to take into consideration the offsets from one item to another within the set tolerances.

In addition, set-up module 32 can include an advanced matching option to enable the user to set up matching on any attribute recorded in a statement line and in the customer's records. As an example, the user can include global or descriptive flex fields, which act as place holder columns that can be used for any purpose in customization.

Matching engine 34 is capable of executing financial reconciliation procedures based on the established matching rules and reconciliation rules. When the user chooses to run the reconciliation procedures, matching engine 34 retrieves the reconciliation rule for the respective account and runs the first matching rule, e.g., the narrowest or strictest matching rule. Particularly, a first item is checked for a match in the customer's records. If there is an exact match according to the matching rule, then the items on both the statement side and customer record side are flagged as reconciled. If there is not an exact match but two items fall within acceptable tolerances established beforehand, then matching engine 34 can automatically adjust the item in customer record storage unit 22 to balance the account according to the acceptable offset. The automatically balanced item is also marked as being reconciled. For an item in the statement that is not matched, even within the acceptable tolerances, the item is flagged as being un-reconciled.

Matching engine 34 repeats these processes for each item of the account and then repeats the reconciliation procedures for additional matching rules, e.g., less strict matching rules. Matching engine 34 checks the items flagged as un-reconciled to see if these item reconcile under the looser matching rules. If matches are found in the later rounds, the flag is changed for the originally un-reconciled items as being reconciled. After matching engine 34 executes the one or more rounds of matching rules for the respective statement, matching engine 34 can then determine if all the items in the statement were flagged as reconciled. If so, the statement itself is also flagged as reconciled and this statement can be stored in a file for reconciled statements. However, if certain items were not reconciled, then matching engine 34 stores the statement in a file for un-reconciled statements. The user may wish to review the un-reconciled statements to further analyze the accounts as needed.

Matching engine 34 can find matches using a set-based SQL by using SQL to find matches for a set of statement lines and transactions instead of repeating each statement line and transaction in the set. The following is an example of pseudo code for such an SQL:

```
INSERT ALL WHEN sCount = 1 AND tCount = 1
    THEN INTO ce_recon_hist_temp_gt VALUES (0, statement_line_id, trx_id, 4)
    WHEN sCount > 1 AND sCount < 6
    THEN INTO ce_exceptions_temp_gt VALUES (0, statement_line_id, trx_id, 4,
        'AMB_TRX')
    WHEN tCount > 1 and tCount < 6
    THEN INTO ce_exceptions_temp_gt VALUES (0, statement_line_id, trx_id, 4,
        'AMB_STMT')
SELECT ln.statement_line_id statement_line_id, trx.trx_id trx_id, count(*) over
    (partition by ln.statement_line_id) sCount, count(*) over (partition by trx.trx_id)
    tCount
    FROM ce_statement_lines_tst ln, ce_trx_tst trx
    WHERE ln.statement_header_id = 1001 AND ln.status = 'UNR' AND trx.status =
        'UNR' AND ABS(ln.amount − trx.amount) <= 10 AND ABS(ln.trx_date −
        trx.trx_date) <=2 AND 1=1
```

After one or more statements have been matched with the customer's records, GUI module 30 may further be configured to provide a work area screen. The work area may include a "reconciled" tab and an "un-reconciled" tab, where one of these tabs can be selected to access the statements under that category. Therefore, if further analysis of financial items is needed, a user can access the particular group of statements.

Figure 4:
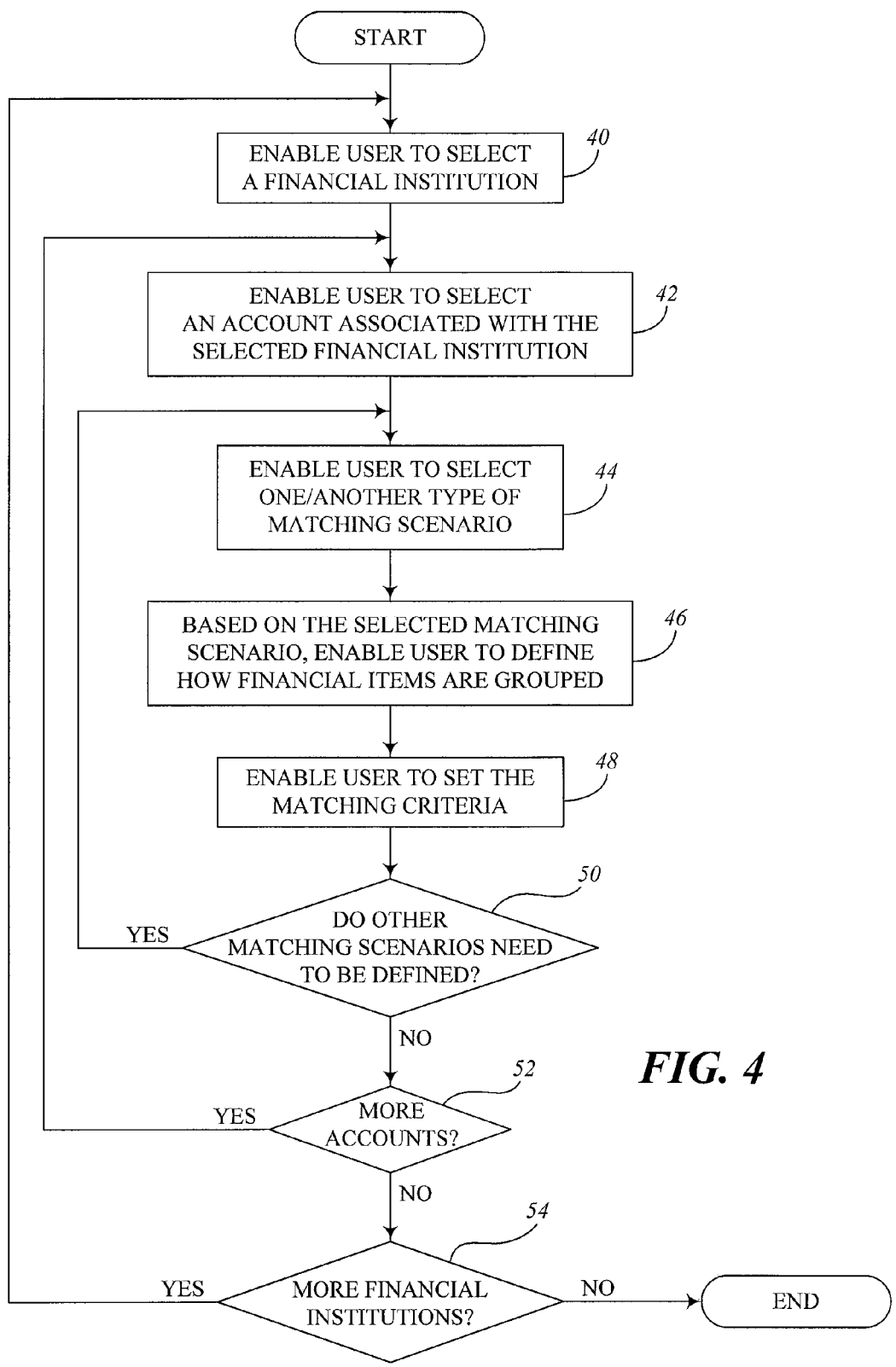
FIG. 4 is a flow diagram illustrating a method for setting up matching rules according to one embodiment.

FIG. 4 is a flow diagram illustrating an embodiment of a method for setting up matching rules. The method of FIG. 4 may be related to the set-up processes of any suitable set-up device, such as set-up module 32 shown in FIG. 3 or other device configured to establish matching rules for financial reconciliation. In the embodiment of FIG. 4, the process enables a user to enter or select a financial institution, as indicated in block 40. As indicated in block 42, the user is enabled to enter or select an account associated with the selected financial institution. As indicated in block 44, the user is enabled to enter or select one type of matching scenario. When this procedure is repeated at a later time during execution of the method of FIG. 4, block 44 also includes enabling the user to select another type of matching scenario. The matching scenarios define whether the items of the financial statement reported by the financial institution are grouped together or whether the items recorded by the customer are grouped together. The matching scenarios also define whether neither or both of the statement items or the customer recorded items are grouped together during the matching stage.

Based on the selected matching scenario, the user is enabled to define how the sets of items to be grouped are grouped, as indicated in block 46. The user is then enabled to set the matching criteria, as indicated in block 48. As indicated by decision block 50, it is determined whether or not the user intends to define other matching scenarios. If more matching scenarios are to be defined, then the process loops back to block 44 and the user is enabled to select another type of matching scenario. If no more matching scenarios are to be defined, the process proceeds to decision block 52. As indicated in block 52, it is determined whether or not the user intends to set up matching rules for an additional account. If so, the process loops back to block 42 and the user is enabled to enter or select another account for the selected financial institution. If no more accounts for the selected financial institution are to be defined, then the process proceeds to decision block 54. In block 54, it is determined whether or not the user intends to set up matching rules for accounts associated with another financial institution. If so, the process loops back to block 40 and the user is enabled to enter another financial institution. If not, the process ends.

FIG. 5 is a diagram illustrating an embodiment of a GUI for managing rules for creating statement transactions for a financial institution. This GUI may be presented after a setup procedure for a list of tasks, which may involve setting up financial institution information and/or account information. The Statement Transaction Creation Rules GUI can be used to define which bank statement lines, or other statement lines from a particular financial institution, create corresponding transactions in the customer's system or records. The user can use this GUI to create system transactions and accounting for "first presentment items" in the financial institution statement, such as bank fees, interest, or other items. In this example, the name of the particular financial institution for which rules of statement information is created is "ABC".

Figure 6:
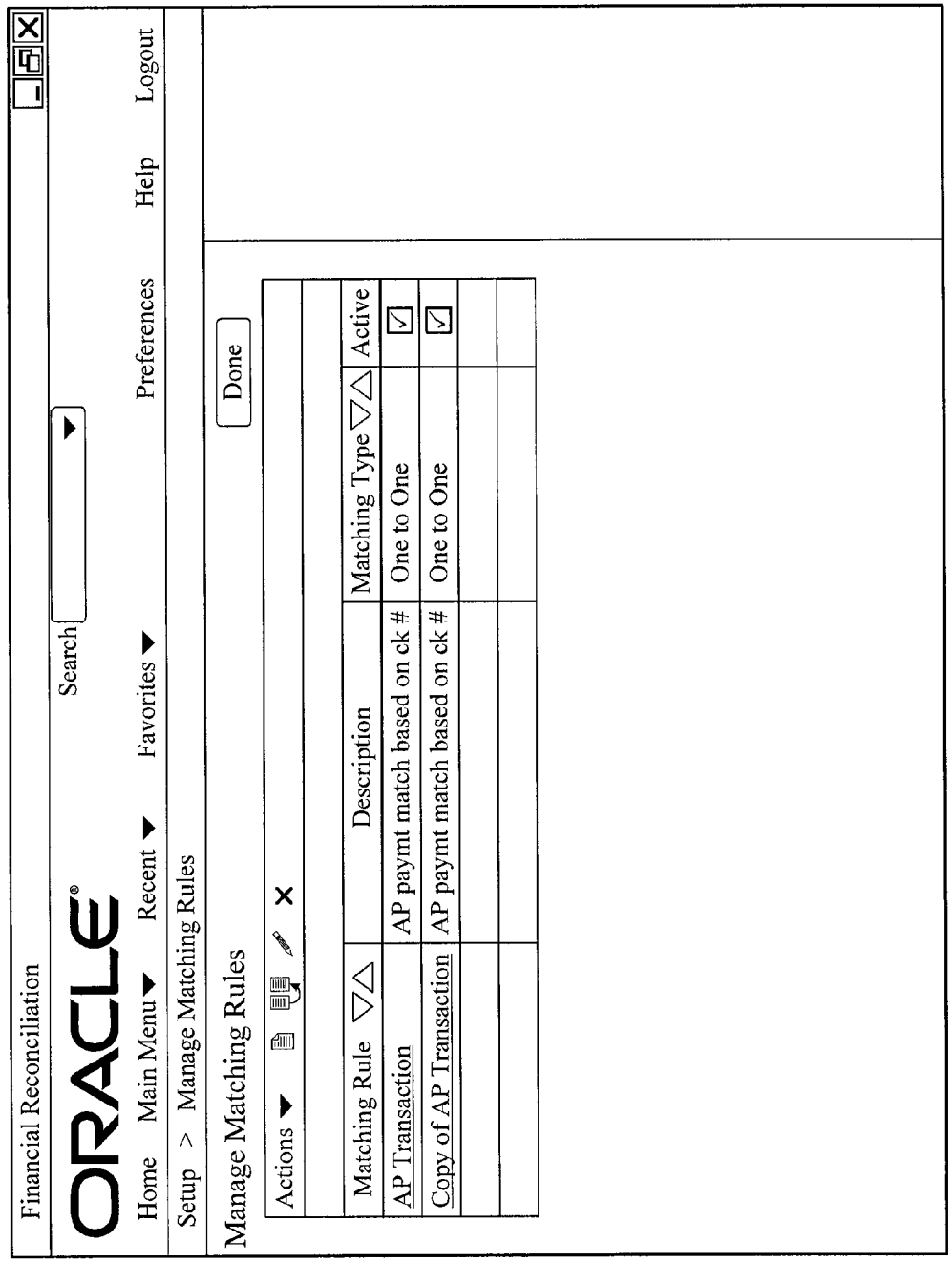
FIG. 6 is a diagram of a GUI for managing matching rules according to one embodiment.

FIG. 6 is a diagram illustrating an embodiment of a GUI for managing matching rules. In this example, two matching rules regarding "AP Transaction" and "Copy of AP Transaction" are being managed. A "description" and "matching type" are defined for each matching rule. FIG. 7 is a diagram illustrating an embodiment of a GUI for creating and editing matching rules. In this example, a matching rule named "123456" is being created and/or edited. The matching rule may include optional transaction sources including, for example, payables, receivables, payrolls, external, etc. Matching rule "123456" in this example has a matching type of "One to One", but may also be defined for 1-M, M-1, and/or M-M types. The matching criteria in this case shows the "basic" criteria, where various criteria can be selected. In this example, the criteria "amount," "date," "transaction type," and "reconciliation reference" can be selected.

Figure 8:
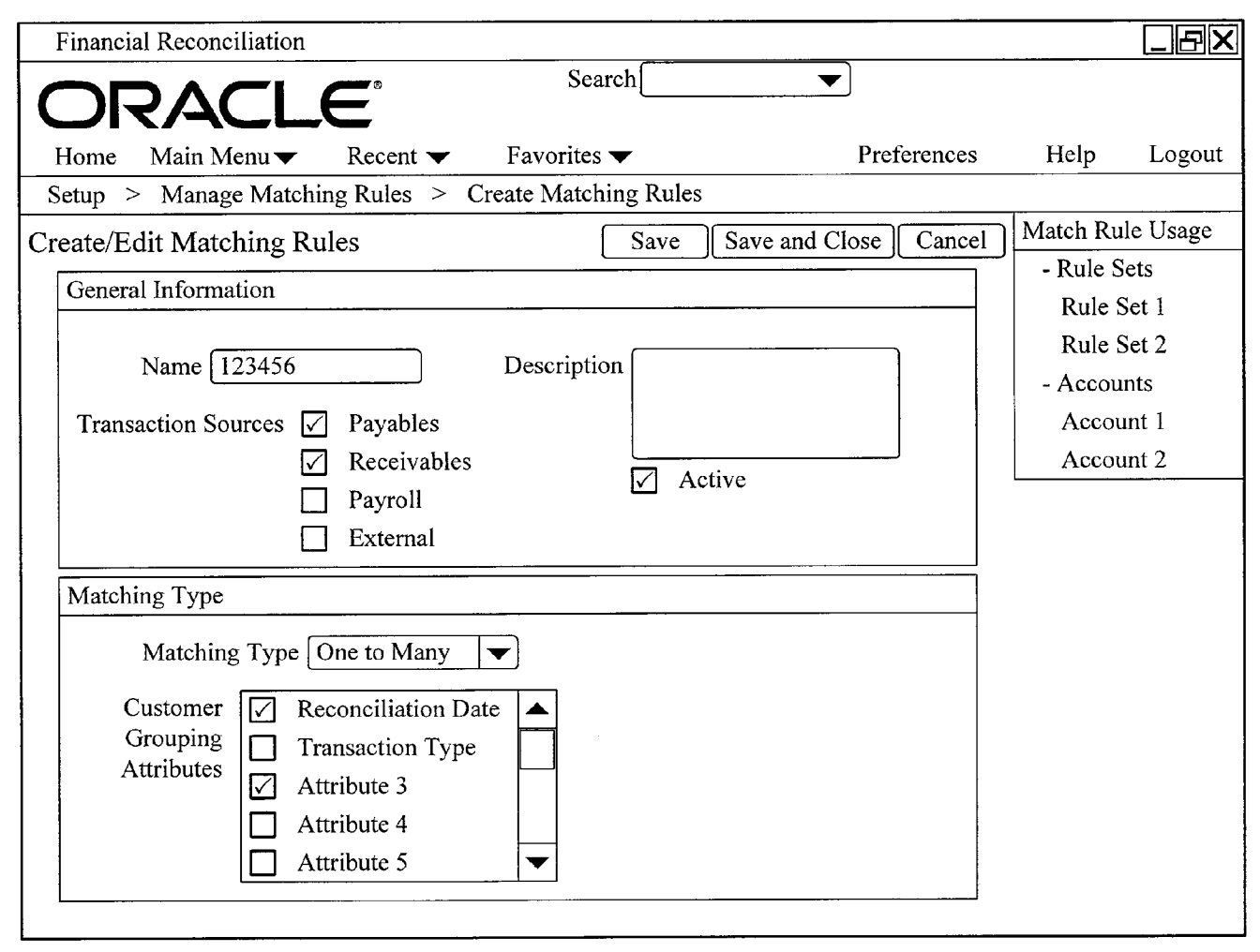
Figure 9:
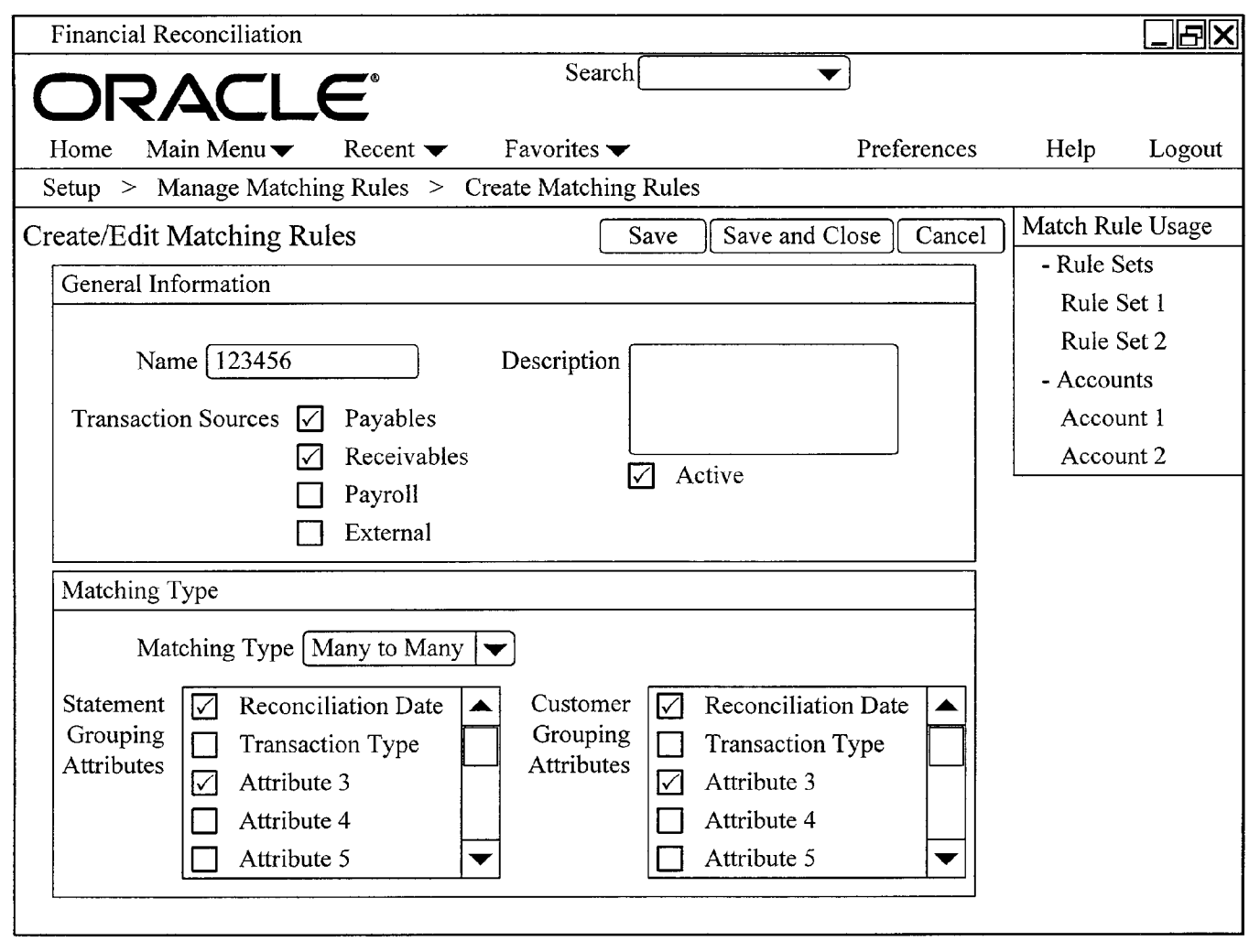

FIGS. 8 and 9 show examples of defining the matching rule "123456" for other matching types other than one-to-one. FIG. 8 is a diagram illustrating another embodiment of a GUI for creating and editing matching rules. In this example, the GUI shows the matching type "one-to-many" being created and/or edited for the matching rule 123456 or other matching rules being managed. Under the matching type one-to-many (1-M), the statement from the financial institution is matching using a single line, but the customer records can be grouped. In this case, the grouping attributes for the customer's records are defined. In the embodiment shown, as an example, the grouping attributes include reconciliation date, transaction type, attribute 3, attribute 4, attribute 5, etc. Although not shown in this diagram, the GUI of FIG. 8 can also include a "matching criteria" section similar to that shown in FIG. 7.

FIG. 9 is a diagram illustrating another embodiment of a GUI for creating and editing matching rules. In this example, the GUI shows the matching type "many to many" (M-M), which can be created and/or edited for the matching rule 123456 or other matching rules being managed. Under the matching type many-to-many, each of the statement from the financial institution and the customer's records can be grouped. In this case, both the statement and customer records include selectable grouping attributes. Although not shown in this diagram, the GUI of FIG. 9 can also include a "matching criteria" section similar to that shown in FIG. 7.

Figure 10:
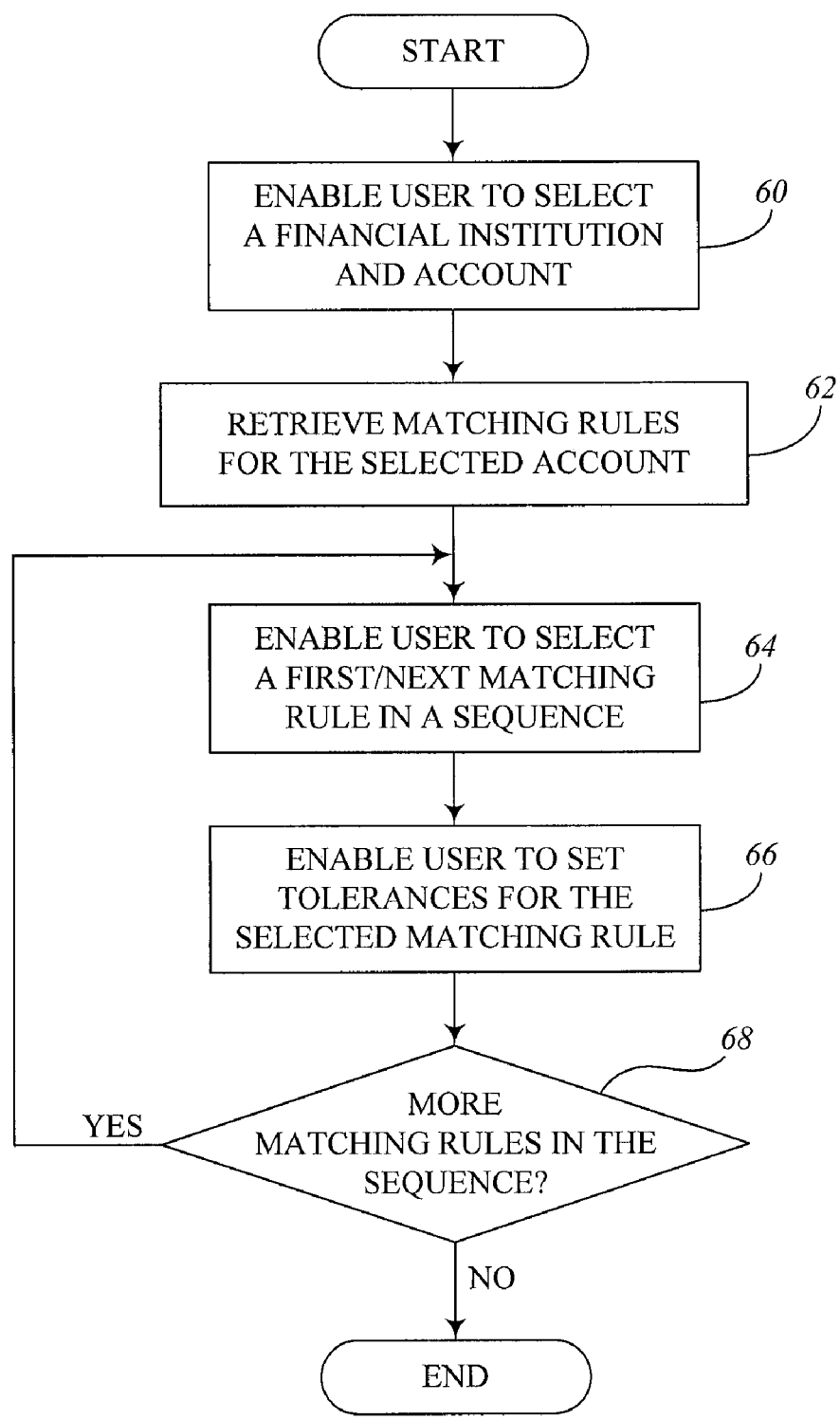
FIG. 10 is a flow diagram illustrating a method for setting up reconciliation rules according to one embodiment.

FIG. 10 is a flow diagram illustrating an embodiment of a method for establishing reconciliation rules based on the matching rules entered by the method of FIG. 4. In the embodiment of FIG. 10, the user is enabled to select a financial institution and an account associated with the financial institution, as indicated in block 60. As indicated in block 62, the method retrieves the matching rules established by the user for the selected account. As indicated in block 64, the user is enabled to select a first matching rule to be applied in a sequence of matching rules for the selected account. When this procedure is repeated at a later time, the user is enabled to select a next matching rule in the sequence. Typically, the matching rules are selected in an order from the strictest to the least strict.

Then, as indicated in block 66, the user is enabled to set tolerances for the matching rule selected with respect to block 64. Based on the particular matching rule, the tolerances may be set at any suitable level. For example, the transaction dates may be considered to match if they are within one day of each other. As indicated in decision block 68, it is determined whether the user intends to add more matching rules in the sequence. If so, the process loops back to block 64 and the user can select the next matching rule in the sequence. If no more matching rules are to be entered as determined in block 68, then the process ends.

Figure 11:
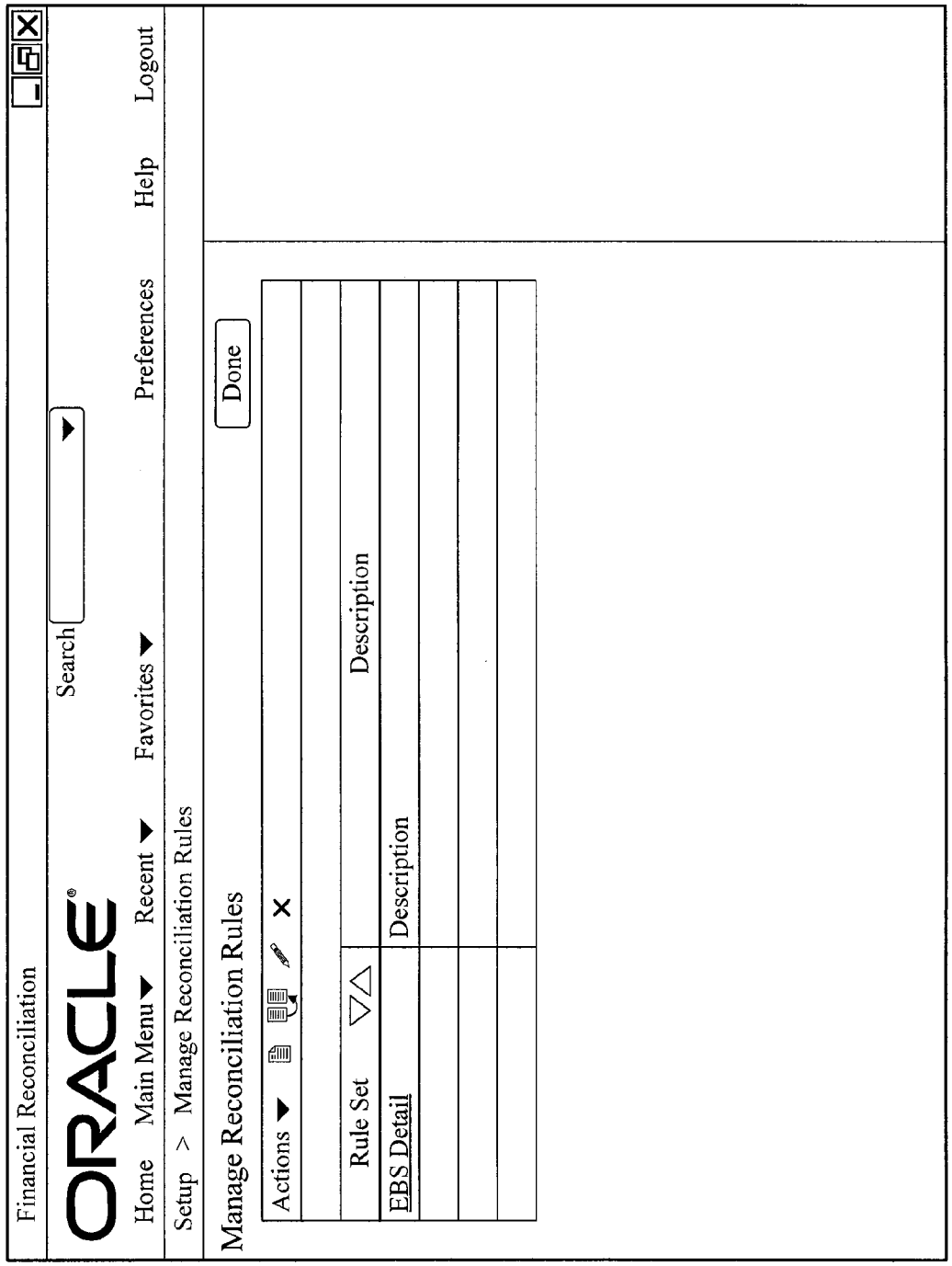
FIG. 11 is a diagram of a GUI for managing reconciliation rules according to one embodiment.

FIG. 11 is a diagram illustrating an embodiment of a GUI for managing reconciliation rules. In this example, the rule or rule set defined as "EBS Detail" is being described. FIG. 12 is a diagram illustrating an embodiment of a GUI for creating and editing reconciliation rules. In this example, the rule set of EBS Detail is created and/or edited. The rule set includes a reconciliation rule having a sequence of three matching rules. The first matching rule of the sequence is named "rule name 1", which has matching type "one-to-many" and has a "strict" tolerance rule. The second matching rule of the sequence is named "rule name 2", which has matching type "many-to-one" and has a "tolerance rule 2" tolerance. The third matching rule of the sequence is named "rule name 3", which has a matching type of "many-to-many" and has a "tolerance rule 3" tolerance. The matching rules, e.g., three matching rules in this case, can be rearranged in a different order by selecting a matching rule and changing the sequence in the "sequence" column. It may be desirable to arrange the sequence of matching rule in an order from the strictest rule to the least strict.

Figure 13:
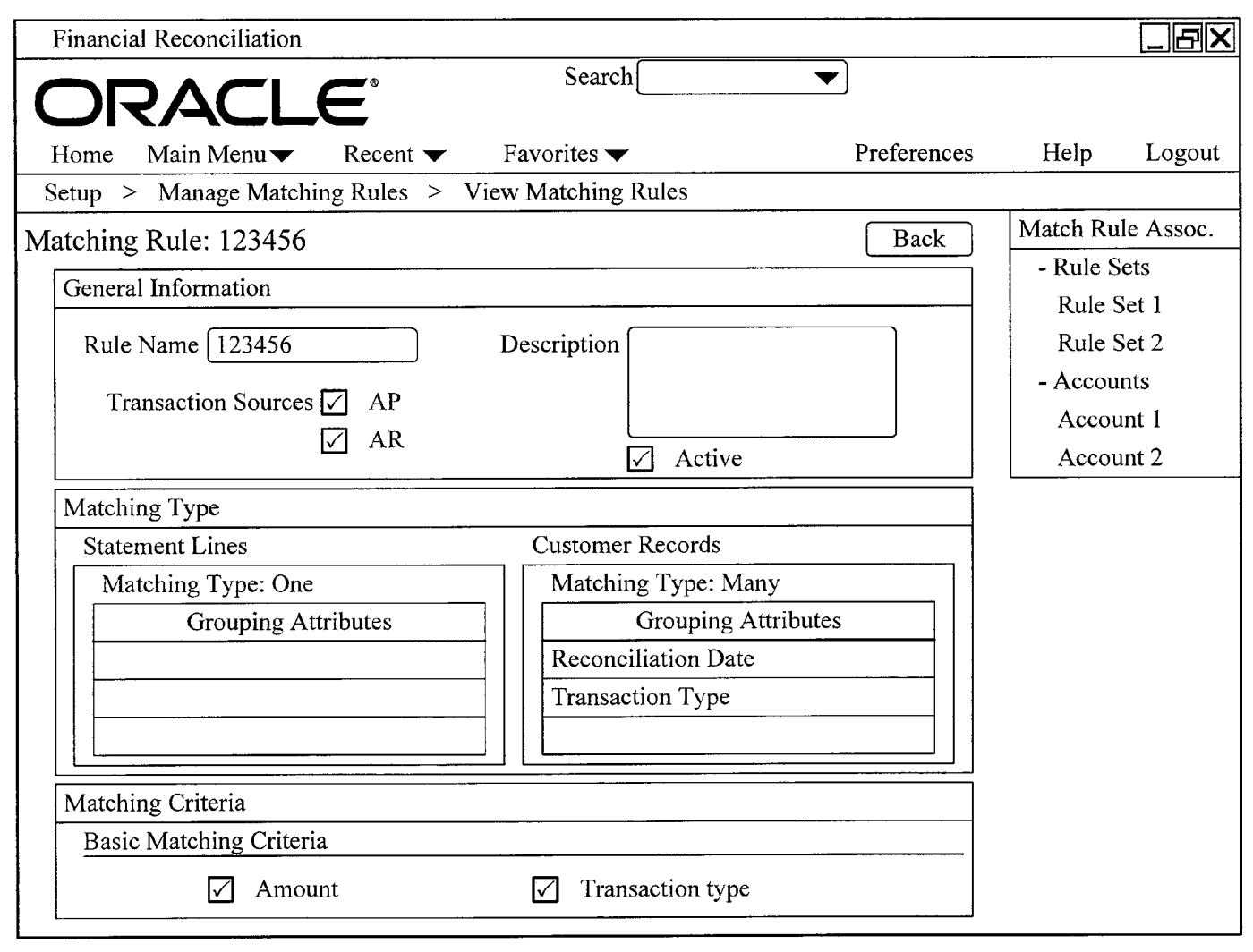

FIG. 13 is a diagram illustrating an embodiment of a GUI for viewing matching rules. In this example, the information selected for the matching rule "123456" is shown. This diagram shows the matching type of "one-to-many", where the statement line matching type is "one" and no grouping attributes are needed since the statement is matched line by line. For the customer records, the matching type is "many" and the grouping attributes selected for the customer records are "reconciliation date" and "transaction type". Also, under the "matching criteria", either "basic" or "advanced" can be selected. For the basic matching criteria, the "amount" and "transaction type" are selected.

Figure 14:
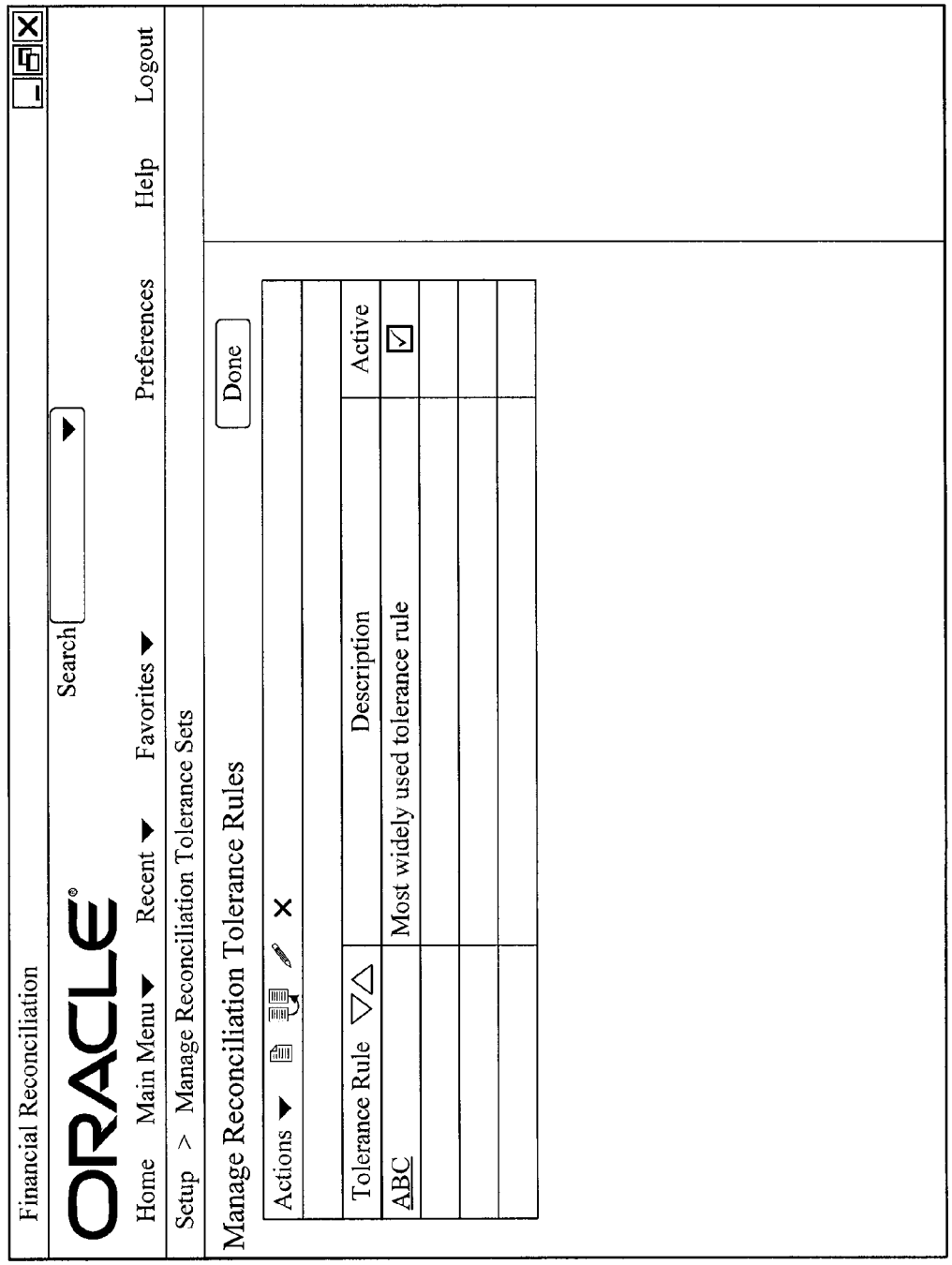
FIG. 14 is a diagram of a GUI for managing reconciliation tolerance rules according to one embodiment.

FIG. 14 is a diagram illustrating an embodiment of a GUI for managing reconciliation tolerance rules. For various reconciliation rules, any number of tolerances can be managed. In this case, the tolerance rule "ABC" is shown and a description for the tolerance rule is described. Once the tolerance rules are defined, the respective reconciliation rules can be created and/or edited to include the defined tolerance rules.

Figure 15:
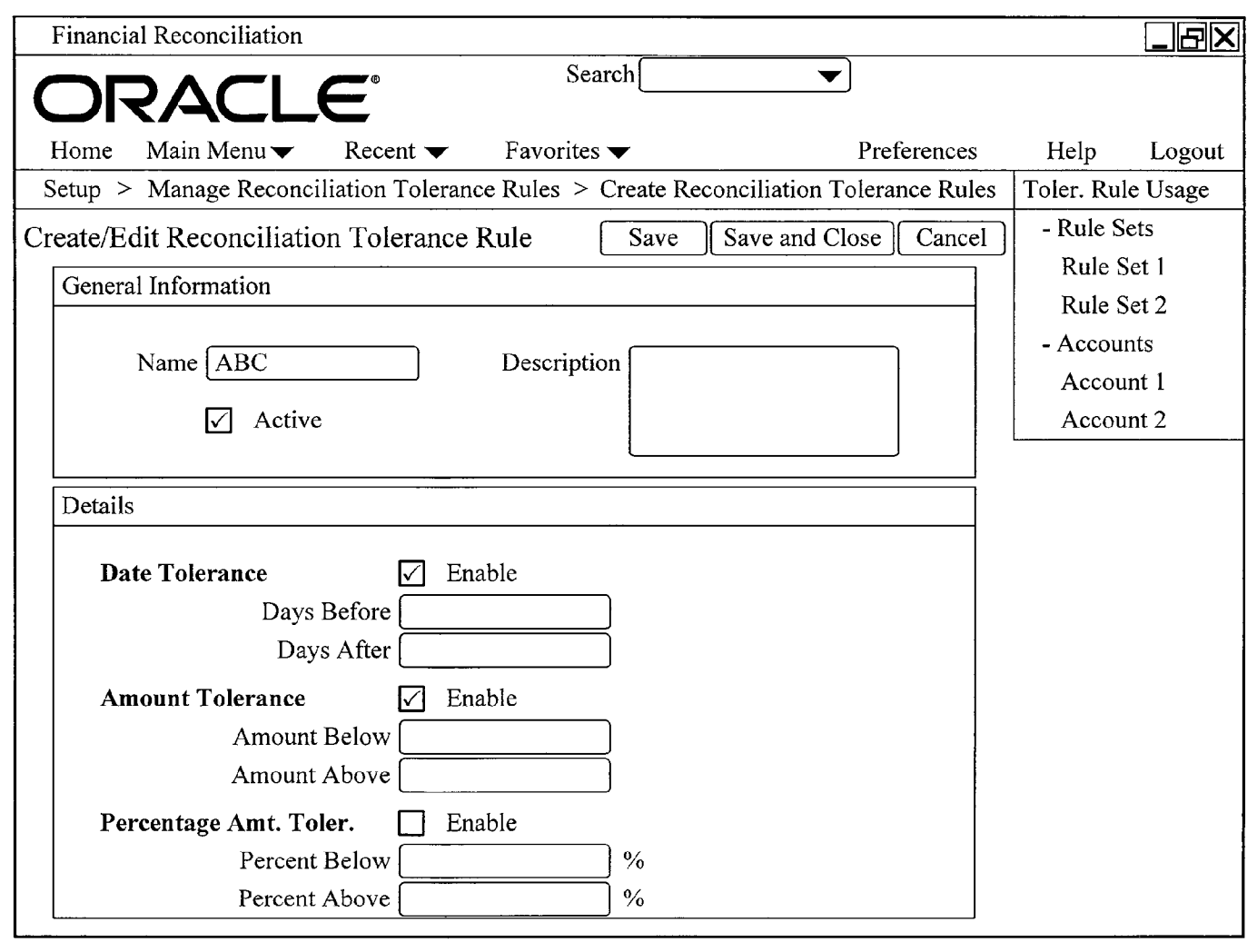

FIG. 15 is a diagram illustrating an embodiment of a GUI for creating and editing reconciliation tolerance rules. In this case, the tolerance rule named "ABC" is being created and/or edited. The details of the tolerance rule include tolerances for "date," "amount," and "percentage." When enabled, the "date tolerance" allows matches for dates in the customer records that are within a certain number of "Days Before" or within a certain number of "Days After" the statement line date. For the "amount tolerance", an amount, when enable, can be within a certain dollar amount below or above the other amount for a match. Also, the amounts can be defined as being within the acceptable tolerances if an amount is within a certain percentage below or above the other amount. FIG. 16 is a diagram illustrating an embodiment of a GUI for viewing reconciliation tolerance rules. In this example, the tolerance rule for ABC, defined as shown with respect to FIG. 15, shows the tolerances entered. For instance, the date tolerance is defined as within 3 days before or within 4 days after the customer recorded date. The amount is defined as within $3.00 below or within $4.00 above the customer recorded amount. Also, the percentage tolerance is entered such that an amount within 5% below or within 6% above the customer recorded amount is considered a match.

Figure 17:
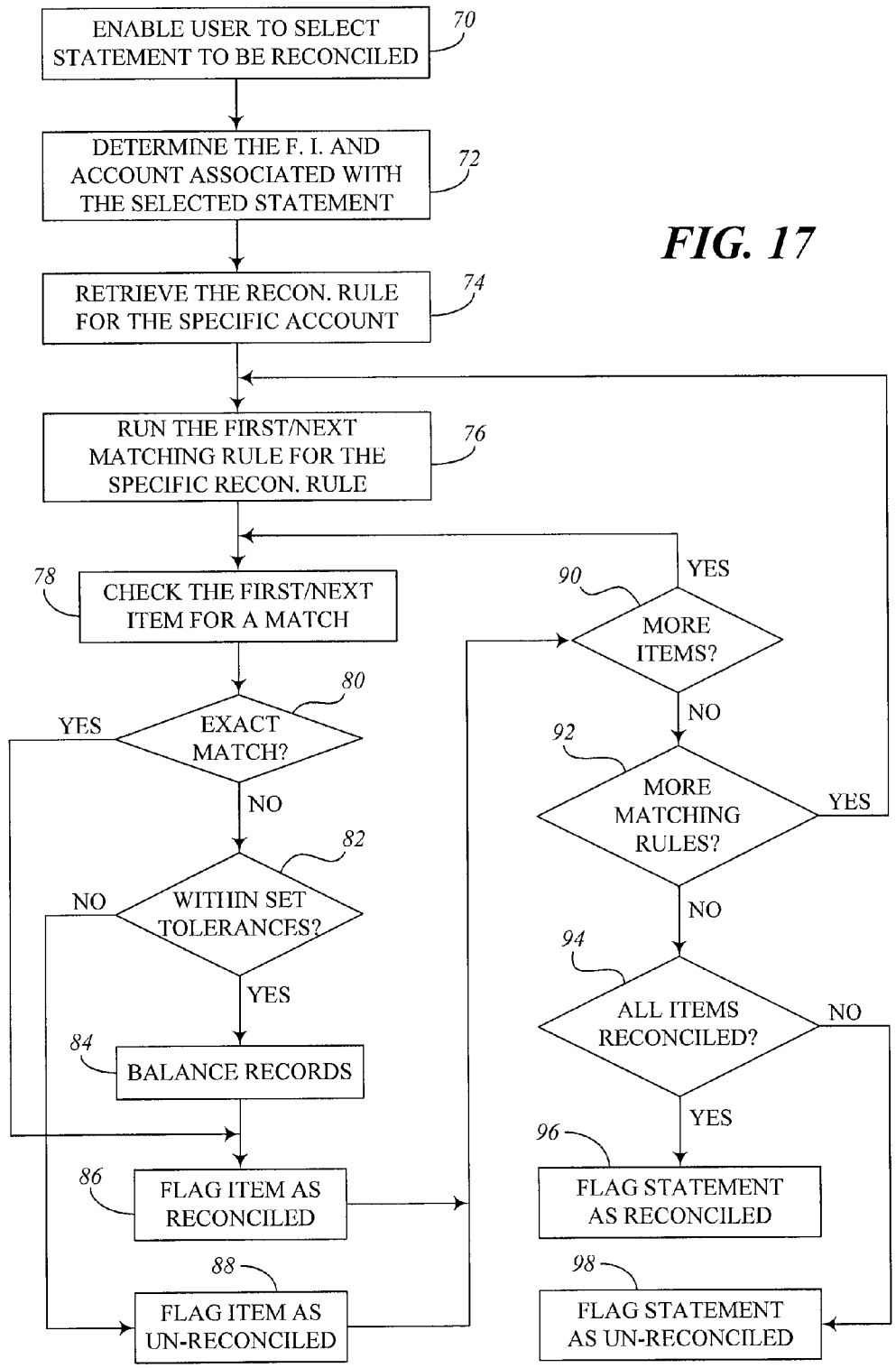
FIG. 17 is a flow diagram illustrating a method of executing financial reconciliation procedures according to one embodiment.

FIG. 17 is a flow diagram illustrating an embodiment of a method for executing financial reconciliation procedures. The reconciliation procedures described with respect to the method of FIG. 6 may be associated with the functions of matching engine 34 described above with respect to the discussion of FIG. 3. In the embodiment of FIG. 6, the method includes enabling the user to select a statement to be reconciled, as indicated by block 70. As indicated in block 72, the method comprises determining the financial institution and account associated with the statement selected with respect to block 70. As indicated with respect to block 74, the reconciliation rule associated with the specific account is retrieved. The reconciliation rule relates to a rule, such as the reconciliation rules established with respect to FIG. 5, which is associated with reconciling statements with respect to a particular account.

As indicated in block 76 of FIG. 6, the process includes running the first matching rule in the sequence of matching rules for the specific reconciliation rule. As indicated in block 78, the process checks the first item of the statement for a match with respect to the information recorded by the customer. When repeated at a later time, block 78 includes checking the next statement item for a match. As indicated in decision block 80, it is determined whether or not an exact match is found. If so, the process skips ahead to block 88. If no exact match is found, the process proceeds to decision block 82. As indicated in decision block 82, it is determined whether the check for an item match of block 78 discovered a match within the set tolerances. If the item matches another item within the set tolerances, then the process proceeds to block 84. If not, then the process skips ahead to block 88.

As indicated in block 84, the customer's records are altered to balance the accounts with the statement from the financial institution. In some embodiments, balancing the accounts may include informing the user of the offset that is within the acceptable tolerances to allow the user to manually balance the account. In other embodiments, the accounts can be balanced automatically. The balancing is performed to correct any offset within the set tolerances, which are typically considered to be of little significance and require minimal human intervention. In this respect, the slight accounting offsets can be automatically balanced with the reports from the financial institutions. In some embodiments, records of the automatic balancing can be kept and can be retrieved when needed in order to see if there are human actions that may require reevaluation.

As indicated in block 86, when an exact match is found or a match is found within the set tolerances, then the item is flagged as reconciled. When an item is flagged as reconciled, then this item does not need to be checked again. Also, block 86 may also include the flagging of the matched item in the customer's records. Thus, both the item in the statement from the financial institution as well as the item in the records of the customer are flagged as being reconciled. If checking the item for a match associated with block 78 does not result in an exact match or a match within the set tolerances, then the item is flagged as un-reconciled, as indicated in block 88. The un-reconciled items can be reconciled manually if appropriate or they can be checked with updated items to attempt reconciliation at a later time. After flagging an item as reconciled or un-reconciled, the method proceeds to decision block 90.

As indicated in block 90, it is determined whether or not there more items in the statement to be checked under the particular matching rule. If so, the process returns back to block 78 and the next item is checked for a match. If no more items are to be checked under the matching rule, then the process proceeds to decision block 92. In block 92, it is determined whether or not more matching rules in the sequence of matching rules of the reconciliation rule are to be run. If so, the process loops back to block 76 and the next matching rule is run. If not, then the method proceeds to decision block 94.

As indicated in block 94, it is determined whether or not all the items on the statement were reconciled. This may be determined by checking whether any items are flagged as un-reconciled. If all the items were reconciled, then the process proceeds to block 96. Otherwise, the process proceeds to block 98. As indicated in block 96, the statement in its entirety is flagged as being completely reconciled. In block 98, it is indicated that the statement is flagged as being un-reconciled. The reconciled statements may be stored with respect to one category, which may not involve additional attention. Otherwise, the un-reconciled statements may be stored in a different category and may need human intervention as necessary. After flagging the statement as reconciled or un-reconciled (blocks 96 and 98), the process comes to an end.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

FIG. 18 is a diagram illustrating an embodiment of a GUI for viewing statements that have not been completely reconciled. These statements can be defined as "incomplete." The information regarding these incomplete statements can be filed under the respective account to which they are associated. For example, statements named "Statement 1," "Statement 2," "Statement 3," "Statement 4," "Statement 5," and "Statement 6" are associated with Account 101. The information includes the statement closing date and the statement entry type. Also recorded are the total number of statement lines in the respective statements and the number of lines that have been reconciled and those that have not been reconciled. The information also includes automatic reconciliation information.

FIG. 19 is a diagram illustrating an embodiment of a GUI for viewing statements that have been completely reconciled, or categorized as "complete." In this example, the statements are grouped with their associated account. The information includes the statement closing date and statement entry type. Also, the total number of reconciled lines can be displayed. In addition, the last column as illustrated in this embodiment includes an indication of whether the statement has been reviewed.

The embodiments described herein represent a number of implementation examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A computer implemented method for reconciling financial transactions using matching rules, the method comprising:
    enabling a user, by generating and displaying a user interface on a computer, to define how different types of financial items are grouped, the grouped financial items selected from one of a financial statement associated with a first account with a first financial institution and financial data recorded by a customer of the first financial institution, wherein the enabling comprises selecting one or more grouping attributes that determine whether the financial items can be grouped together;
    enabling the user, by generating and displaying the user interface on the computer, to set matching criteria for matching financial items of the financial statement with financial items of the customer recorded financial data, wherein the matching criteria comprise a one-to-one, a one-to-many, a many-to-one, or a many-to-many criteria for matching financial statement items with customer items;
    setting up a matching rule comprising the grouping attributes and the matching Criteria;
    receiving reconciliation rules at the computer, the reconciliation rules comprising tolerances for the matching criteria and a sequence of the matching rules; and
    reconciling the financial statement items with the customer items based on the matching rules and the reconciliation rules.

2. The method of claim 1, wherein enabling the user to set matching criteria comprises enabling the user to set matching criteria for matching grouped financial items of the financial statement with one financial item of the customer recorded financial data.

3. The method of claim 1, wherein enabling the user to set matching criteria comprises enabling the user to set matching criteria for matching one financial item of the financial statement with grouped financial items of the customer recorded financial data.

4. The method of claim 1, wherein enabling the user to set matching criteria comprises enabling the user to set matching criteria for matching grouped financial items of the financial statement with grouped financial items of the customer recorded financial data.

5. The method of claim 1, wherein the matching criteria includes one or more pieces of information selected from the group consisting of transaction amount, transaction date, type of transaction, transaction reference number, customer name, account number, group key, and transaction code.

6. The method of claim 5, wherein the matching criteria further includes a customized piece of information defined by the user.

7. The method of claim 1, further comprising enabling the user to define how different types of financial items are grouped for a second account and enabling the user to set matching criteria for the second account.

8. The method of claim 7, wherein the second account is associated with a second financial institution.

9. The method of claim 1, further comprising enabling the user to select a sequence in which a number of matching rules can be executed, the matching rules including information about how different types of financial items are grouped and information related to matching criteria.

10. The method of claim 9, further comprising executing each matching rule of the sequence.

11. The method of claim 10, wherein executing a matching rule comprises:
checking each item or group of items from the financial statement for a match with an item of group of items in the customer recorded financial records;
flagging the item as reconciled if an exact match or a match within the acceptable tolerances is found; and
flagging the item as un-reconciled if no exact match or no match within the acceptable tolerances is found.

12. The method of claim 11, wherein executing the matching rule further comprises adjusting the financial records recorded by the customer to correct the offset of a match within the acceptable tolerances.

13. The method of claim 11, further comprising flagging the financial statement as reconciled if it is determined that all the items or groups of items in the financial statement are flagged as reconciled.

14. A financial reconciliation system for reconciling financial transactions between a financial institution and a customer using matching rules, the financial reconciliation system comprising:
a memory device configured to store an electronic copy of a financial statement reported by the financial institution, the memory device further configured to store financial data recorded by the customer; and
a processing device configured to execute procedures of a reconciliation module, the reconciliation module including:
logic configured to enable a user to define how financial items are grouped, wherein the financial items are taken from one of the financial statement reported by the financial institution and the financial data recorded by the customer, wherein the defining comprises selecting one or more grouping attributes that determine whether the financial items can be grouped together;
logic configured to enable the user to set matching criteria for matching financial items of the financial statement with financial items of the customer recorded financial data, wherein the matching criteria comprises a one-to-one, a one-to-many, a many-to-one, or a many-to-many criteria for matching financial statement items with customer items;
logic configured to set up a matching rule comprising the grouping attributes and the matching criteria;
logic configured to receive reconciliation rules comprising tolerances for the matching criteria and a sequence of the matching rules; and
logic configured to reconcile the financial statement items with the customer items based on the matching rules and the reconciliation rules.

15. The financial reconciliation system of claim 14, further comprising a network interface configured to enable the financial reconciliation system to access information from one or more financial systems associated with the customer.

16. The financial reconciliation system of claim 14, wherein the reconciliation module further comprises:
a graphical user interface module for providing one or more graphical user interfaces enabling the user to enter or select information;
a set-up module configured to enable the user to set up grouping attributes and matching criteria; and
a matching engine configured to execute financial reconciliation processes based on the grouping attributes and matching criteria.

17. Computer-readable media having financial reconciliation instructions stored thereon for reconciling financial transactions using matching rules, the financial reconciliation instructions being executable by a processor, the financial reconciliation instructions comprising:
logic adapted to enable a user to set up matching rules for defining grouping attributes and matching criteria, wherein grouping attributes relate to how financial items from one or both of a financial statement reported by a financial institution and financial records recorded by a customer of the financial institution are grouped, and wherein matching criteria relate to data associated with a financial transaction defined by the financial items; and
logic adapted to run a first matching rule for the financial statement;
wherein the matching criteria comprises a one-to-one, a one-to-many, a many-to-one, or a many-to-many criteria for matching financial statement items with customer items;
wherein the matching rules further comprise reconciliation rules comprising tolerances for the matching criteria and a sequence of the matching rules.

18. The computer-readable media of claim 17, wherein the logic adapted to run the first matching rule is configured to run additional matching rules.

19. The computer-readable media of claim 17, wherein the logic adapted to run the first matching rule is configured to check one or more financial items or groups of financial items of the financial statement for a match with one or more financial items or groups of financial items in the customer recorded financial records.

20. The computer-readable media of claim 19, wherein the logic adapted to run the first matching rule is further configured to determine whether or not the check results in an exact match.

21. The computer-readable media of claim 20, wherein the logic adapted to run the first matching rule is configured to flag the financial items and/or groups of financial items of the financial statement as being reconciled when the check results in an exact match or when the check results in a match within predefined acceptable tolerances.

22. The computer-readable media of claim 17, wherein the financial reconciliation instructions further comprise logic adapted to present one or more graphical user interfaces enabling the user to enter, select, and/or retrieve information regarding the financial institution, an account associated with the financial institution, the financial statement, and the matching rules.

* * * * *

UNITED STATES PATENT AND TRADEMARK OFFICE
CERTIFICATE OF CORRECTION

| | | |
|---|---|---|
| PATENT NO. | : 8,103,561 B2 | |
| APPLICATION NO. | : 12/271157 | |
| DATED | : January 24, 2012 | |
| INVENTOR(S) | : Chung et al. | |

It is certified that error appears in the above-identified patent and that said Letters Patent is hereby corrected as shown below:

In column 12, line 59, in Claim 1, delete "Criteria;" and insert -- criteria; --, therefor.

Signed and Sealed this
Third Day of April, 2012

David J. Kappos
*Director of the United States Patent and Trademark Office*